No. 758,888. PATENTED MAY 3, 1904.
W. N. BARRETT.
JOINT.
APPLICATION FILED OCT. 23, 1903.
NO MODEL.
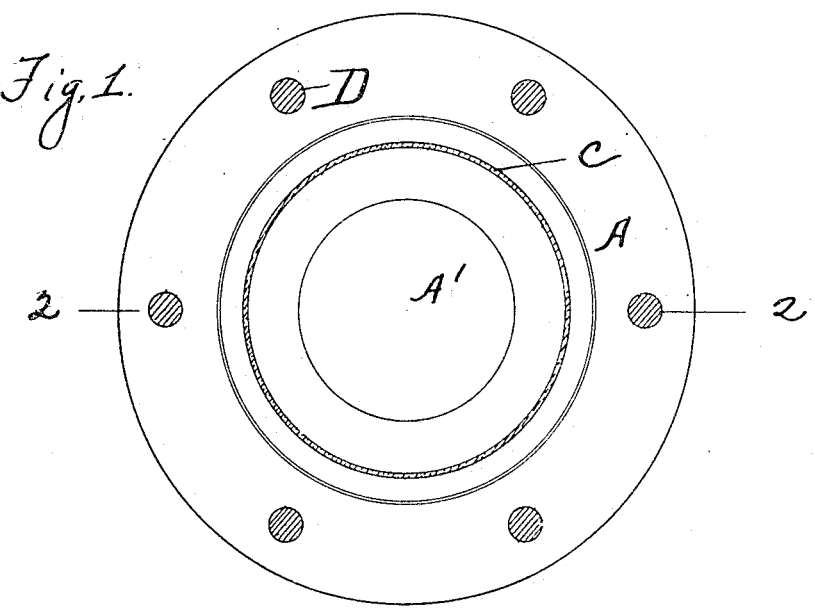
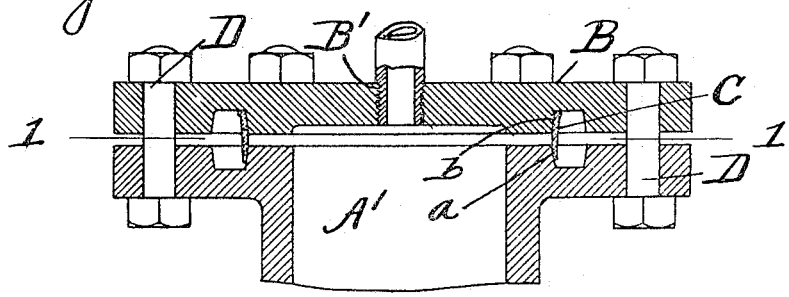
Witnesses
Amy T. White
Margaret Sullivan
Inventor
William N. Barrett
by N. C. L.
Attorney No. 758,888.

Patented May 3, 1904.

UNITED STATES PATENT OFFICE.

WILLIAM N. BARRETT, OF SOMERSET, PENNSYLVANIA.

JOINT.

SPECIFICATION forming part of Letters Patent No. 758,888, dated May 3, 1904.

Application filed October 28, 1903. Serial No. 178,850. (No model.)

*To all whom it may concern:*

Be it known that I, WILLIAM N. BARRETT, a citizen of the United States, residing at Somerset, in the county of Somerset and State of Pennsylvania, have invented new and useful Improvements in Joints, of which the following is a specification.

This invention relates to joints; and it consists in certain improvements in the construction thereof, as will be hereinafter fully described, and pointed out in the claims.

The object of the invention is to provide a joint which may be readily assembled, especially with such shapes as it is not convenient to use a threaded joint, such as sections of water-heaters, boilers, radiators, &c.

In the drawings the joint is shown between two ordinary fittings.

Figure 1 shows a section on the line 1 1 in Fig. 2; Fig. 2, a line 2 2 in Fig. 1.

A fitting A has the opening A' and the beveled shoulder $a$, surrounding said opening. As shown, the taper is on the outer periphery. The fitting B has the opening B' and beveled shoulder $b$, surrounding said opening. The shoulders $a'$ and $b'$ form opposing tapered surfaces. Interposed between the beveled shoulders $a$ and $b$ is a metallic band C. The bolts D are provided for subjecting the joint to pressure, so as to force the shoulders $a$ and $b$ into the engaging surfaces of the band C.

The band C is preferably of soft material, such as copper or brass, and comparatively thin, so that it readily shapes itself to the beveled shoulders $a$ and $b$. In this manner a perfect joint may be quickly assembled.

It will be noted that the joint comprises as elements the fittings A and B and band C and that said parts (in the specific construction shown the fittings) are provided with opposing tapered surfaces (as shown the shoulders $a$) and engaging surfaces (in the specific construction on the band C) forming continuous contacts to close the joint.

What I claim as new is—

1. In a joint the combination of two fittings and a connecting-band, said parts being provided with opposing tapered surfaces surrounding the opening in the joint and with engaging surfaces forming a continuous contact with the tapered surfaces to close the joint.

2. In a joint the combination of two fittings and a connecting metallic band, said parts being provided with opposing tapered surfaces surrounding the opening in the joint and with engaging surfaces forming a continuous contact with the tapered surfaces to close the joint.

3. In a joint the combination of two fittings and a connecting-band, said fittings being provided with opposing tapered surfaces surrounding the opening in the joint and said band being provided with engaging surfaces forming continuous contact with the tapered surfaces to close the joint.

4. In a joint the combination of two fittings and a connecting-band said fittings being provided with opposing shoulders having their exterior surfaces tapered, said shoulders surrounding the opening in the joint, and said band having engaging surfaces forming continuous contacts to close the joint.

5. In a joint the combination of two fittings or parts to be connected; a metallic band, said fittings being provided with opposing tapered shoulders surrounding the opening in the joint and said band being formed of material and of a thickness to shape itself to the tapered shoulder as the tapered shoulder is forced against it.

6. In a joint the combination of the part A having the tapered shoulder $a$ thereon; the part B having the tapered shoulder $b$ arranged opposite the tapered shoulder $a$, the thin metallic band C arranged on said shoulders and means for forcing said shoulders into said band.

In testimony whereof I have hereunto set my hand in the presence of two subscribing witnesses.

WILLIAM N. BARRETT.

Witnesses:
W. W. VENABLE,
C. S. FALLS.